July 4, 1950  E. F. WILKINSON  2,513,539
SALT DISPENSER
Filed April 15, 1947

INVENTOR.
EDWARD F. WILKINSON
BY Victor J. Evans & Co.
ATTORNEYS

Patented July 4, 1950

2,513,539

UNITED STATES PATENT OFFICE 2,513,539

SALT DISPENSER

Edward F. Wilkinson, New Orleans, La.

Application April 15, 1947, Serial No. 741,541

2 Claims. (Cl. 222—131)

This invention relates to salt dispensers or shakers.

It is an object of the present invention to provide a salt dispenser or shaker which will keep salt dry in any climate.

It is another object of the present invention to provide a salt dispenser which has a metered flow of salt therefrom whereby the salt can be dispensed from the shaker with a large flow of salt and whereby the small openings ordinarily used with a salt shaker are dispensed with and wherein the salt as it leaves the opening is gathered upon a strainer separate and apart from the closure having the opening therein and by means of which the salt can be spread or sprinkled in the desired amount through the holes within the strainer.

Other objects of the present invention are to provide a climate-proof salt dispenser which is of simple construction, inexpensive to manufacture and efficient in operation.

For other objects and for a better understanding of the invention, reference may be had to the following detailed description taken in connection with the accompanying drawing, in which Fig. 1 is a side elevational view of the dispenser with the metering pin in place in the top closure member.

Figure 1:
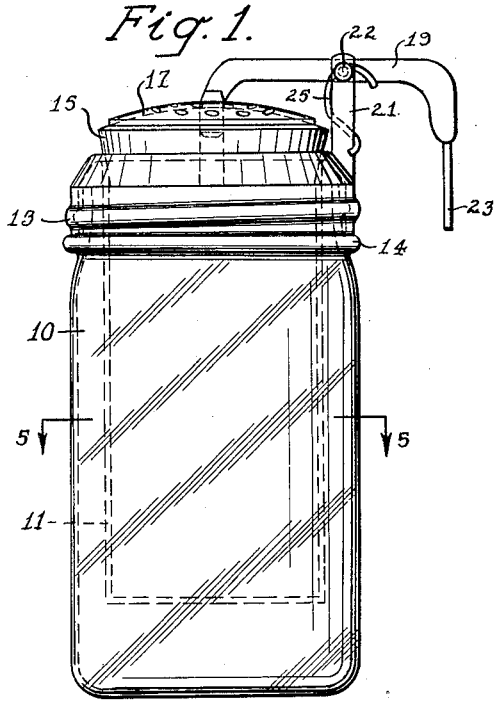
Figure 2:
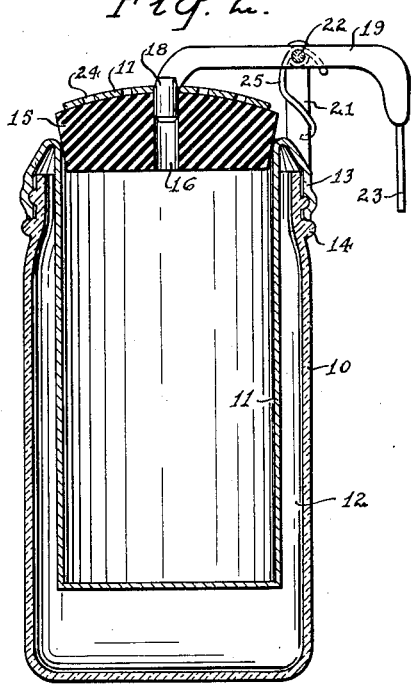
Fig. 2 is a vertical cross-sectional view of the dispenser.
Figure 3:
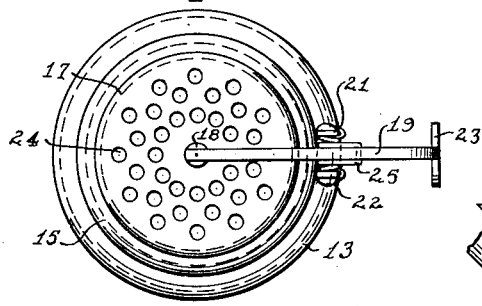
Fig. 3 is a top plan view of the dispenser.
Figure 4:
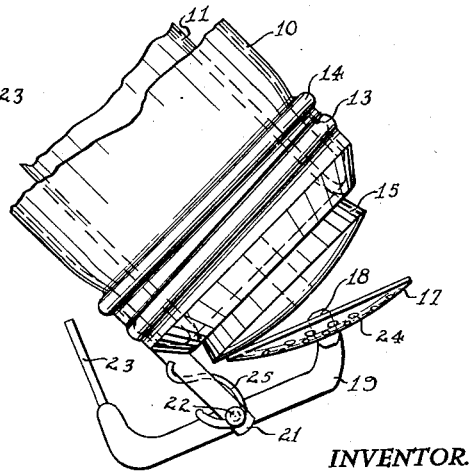
Fig. 4 is a fragmentary view of the dispenser inverted and ready to be used to dispense salt which will be deposited upon the strainer which is free of the rubber closure.
Figure 5:
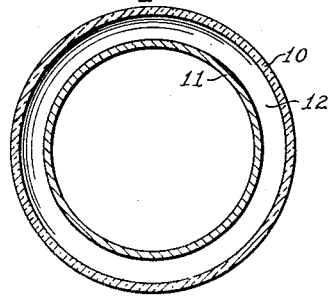
Fig. 5 is a transverse cross-sectional view taken on line 5—5 of Fig. 1.

Referring now to the figures, 10 represents an outer casing and 11 represents an inner vessel or container adapted to be screw fitted to the outer casing so as to be spaced therefrom and to provide a vacuum space 12 therebetween. The inner vessel 11 is of metal and contains the salt. The vacuum space 12 provides insulation whereby to keep the salt at even temperature. The outer casing 10 is made of glass. The inner vessel has at its top an outwardly and downwardly flared flange with internal threads thereon as indicated at 13 and is threadedly connected to threads 14 on the top of the glass jar 10. The top of the salt container 11 is closed by a rubber plug or cork 15 in which there is a central hole or opening 16 through which salt is poured out upon a distributor 17 when the dispenser is inverted to the position shown in Fig. 4 and the distributor 17 has been separated from the top of the rubber closure 15. The distributor 17 is fixed to a pin or plug formation 18 on the end of a lever 19 which is pivoted upon an upright bearing post or support 21 as indicated at 22 and which has a depending portion or handle 23 adapted to be depressed by the thumb so as to remove the pin 18 from the hole 16 and to position the distributor 17 so as to receive the salt. It should now be apparent that the small openings as indicated at 24 are provided in a separable distributor rather than in the closure which fits the top of the salt container 11. Hole 16 is closed by the plug 18 when the lever 19 is released. A spring 25 is connected between the lever and the upright support 21 to effect the return of the lever and the plug upon release of the lever.

While various changes may be made in the detailed construction, it shall be understood that such changes shall be within the spirit and scope of the present invention as defined by the appended claims.

I claim:

1. In a salt shaker, the combination which comprises an outer casing having a neck with threads on the outer surface at the upper end, an inner container having an outwardly extended depending flange threaded to correspond with the threads of the neck of the outer casing and positioned thereon, a rubber cork with a centrally disposed opening therethrough providing a closure for the inner container, a cover having perforations therein providing a distributor nested on the outer surface of the cork, said distributor having a centrally disposed plug carried thereby positioned in the outer end of the centrally disposed opening of the cork, a bearing post carried by the outer depending flange of the inner container, an arm having a handle on the outer end thereof pivotally mounted in the said bearing post and with the inner end thereof connected to the said distributor and plug, and a spring on said bearing post urging said arm in the position of holding the plug in the centrally disposed opening of the cork.

2. In a salt shaker, the combination which comprises a tubular casing closed at the lower end and open at the upper end, a resilient plug having a centrally disposed opening therein and provided with an arcuate outer surface positioned in the open end of the casing, a perforated arcuate cover nested on the upper surface of the plug carrying a centrally disposed plug positioned in the centrally disposed opening of the resilient plug, a bearing post positioned on the casing and extended upwardly therefrom, an arm pivotally mounted in the bearing post having a handle at one end and with the opposite end connected to the perforated cover, and resilient means urging the arm in the position of holding the cover against the resilient plug.

EDWARD F. WILKINSON.

REFERENCES CITED

The following references are of record in the file of this patent:

UNITED STATES PATENTS

| Number | Name | Date |
|---|---|---|
| 294,341 | Wilcox | Feb. 26, 1884 |
| 313,718 | Fonerden | Mar. 10, 1885 |
| 470,410 | Pangle | Mar. 8, 1892 |
| 533,367 | McBoyle | Jan. 29, 1895 |
| 572,138 | Thatcher | Dec. 1, 1896 |
| 886,272 | Suzuki | Apr. 28, 1908 |
| 1,221,630 | Trautman | Apr. 3, 1917 |
| 1,515,513 | Moriarty | Nov. 11, 1924 |
| 1,820,817 | McRae | Aug. 25, 1931 |
| 1,974,332 | Hauck | Sept. 18, 1934 |
| 2,159,259 | Dootson | May 23, 1939 |
| 2,272,867 | Cobel | Feb. 10, 1942 |

FOREIGN PATENTS

| Number | Country | Date |
|---|---|---|
| 201,132 | Great Britain | 1924 |
| 289,743 | Great Britain | May 3, 1928 |